Feb. 18, 1936.   P. F. SPERRY   2,031,012
HEAT EXCHANGE APPARATUS
Filed June 10, 1935   2 Sheets-Sheet 1
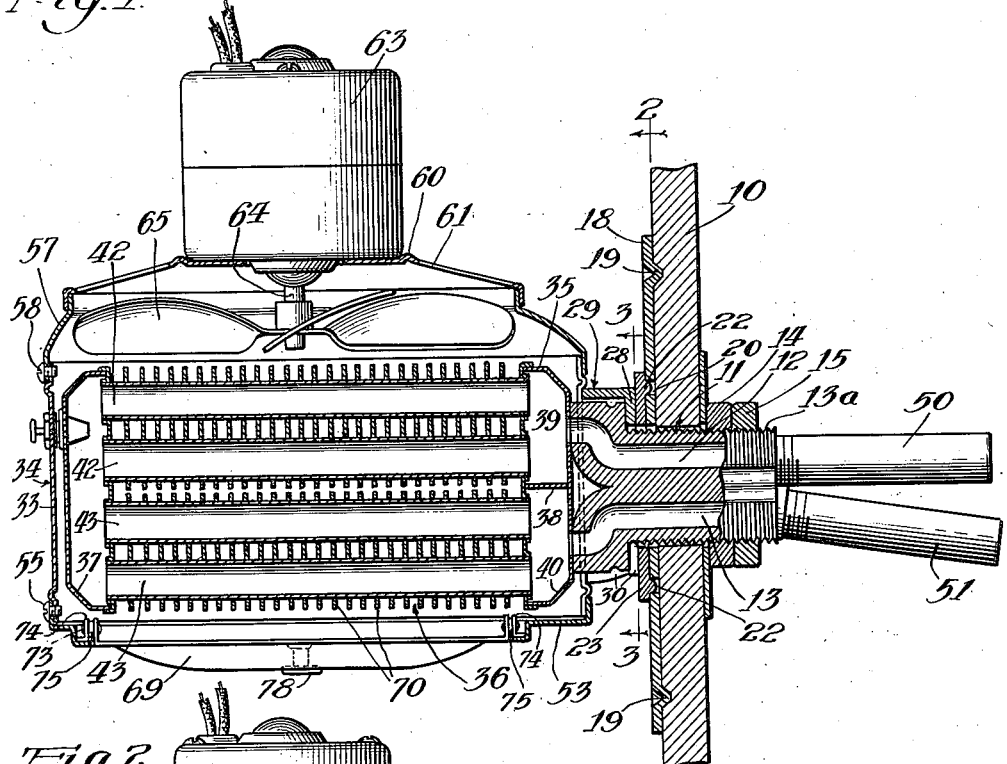
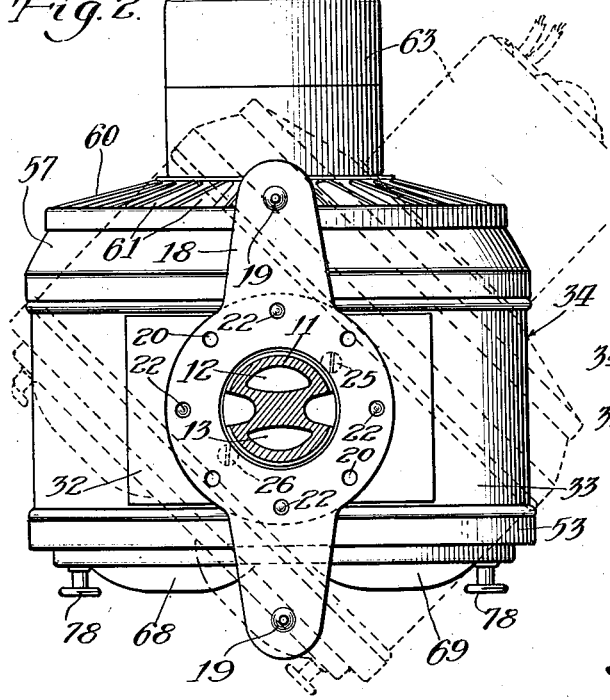
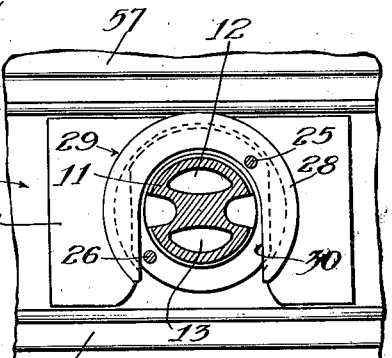
Inventor:
Philmore F. Sperry.
By: Zabel, Carlson & Wells
Attorney Feb. 18, 1936.  P. F. SPERRY  2,031,012
HEAT EXCHANGE APPARATUS
Filed June 10, 1935   2 Sheets-Sheet 2
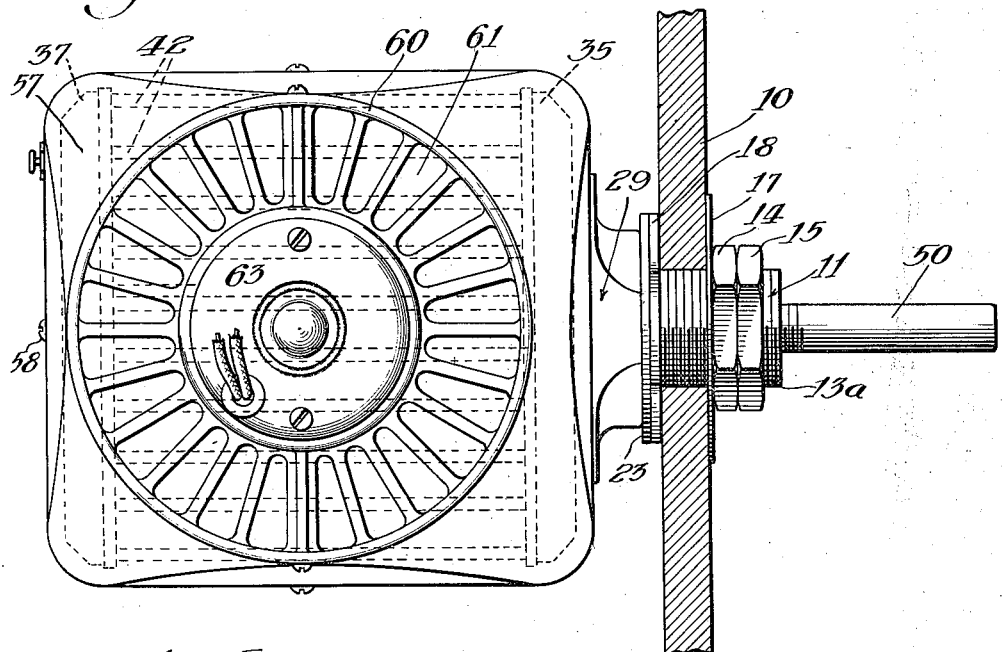
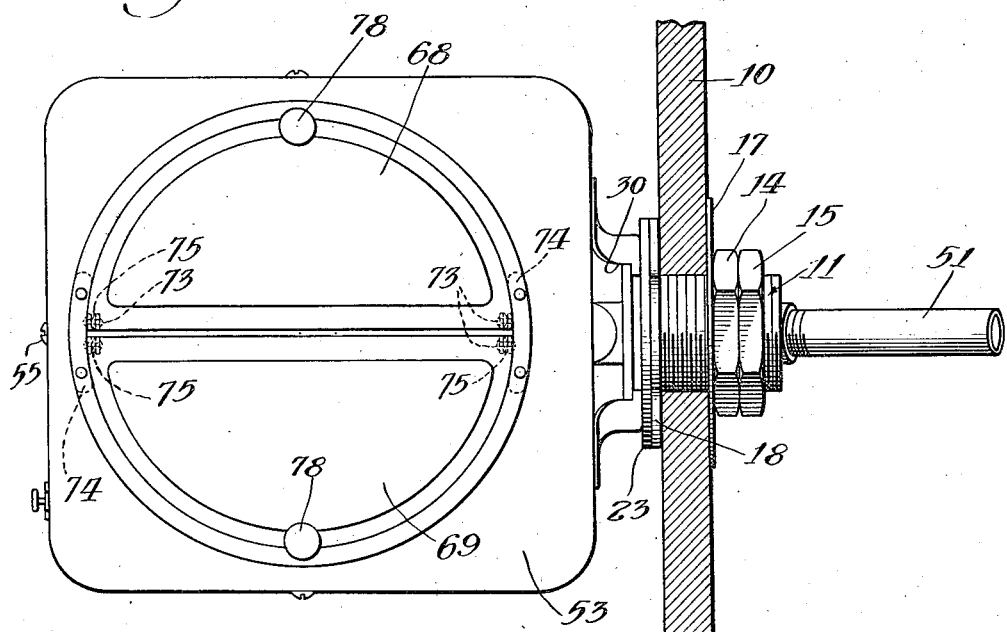
Inventor:
Philmore F. Sperry,
By: Zabel, Carlson & Wells
Attorneys Patented Feb. 18, 1936

2,031,012

UNITED STATES PATENT OFFICE 2,031,012

HEAT EXCHANGE APPARATUS

Philmore F. Sperry, Chicago, Ill., assignor to Excel Auto Radiator Company, a corporation of Delaware Application June 10, 1935, Serial No. 25,960

4 Claims. (Cl. 257—137)

The invention relates to heat exchange apparatus and is particularly adapted to be embodied in a heater of the type commonly employed in automobiles to utilize the heat of the cooling fluid in the internal combustion engine to heat the interior of the automobile.

One form of the invention is embodied in a heater comprising a housing which encloses a radiator core. An electric motor mounted on the housing advances air through the radiator core so that there will be an efficient exchange of heat between the cooling fluid of the automobile and the air within the interior of the automobile. The radiator core has spaced tanks which communicate with each other through a plurality of sheet metal tubes. One of the tanks is divided into two compartments and the cooling fluid of the automobile engine flows from one compartment through certain of the tubes to the other tank and thence through the remaining tubes to the other compartment. The means for connecting the two compartments to the cooling system of the automobile is a pipe fitting extending through and mounted in the dashboard of the automobile. The fitting supports the radiator core, the housing and the motor as a unit, the construction being such that the unit is adjustably mounted. It is preferably arranged to direct the flow of heated air downwardly.

Other objects and advantages of the invention will become apparent as the following detailed description progresses, reference being had to the accompanying drawings, wherein—

Fig. 1 is a vertical longitudinal section taken through an automobile heater which embodies the invention, the heater being shown in connection with the dashboard of an automobile.

Fig. 2 is a section taken on line 2—2 of Fig. 1.

Fig. 3 is a fragmentary section taken on line 3—3 of Fig. 1.

Fig. 4 is a top plan view of the improved heater, the heater being shown in connection with the dashboard which is in section, and Fig. 5 is a bottom plan view of the improved heater.

Referring to the drawings wherein a preferred embodiment of the invention is illustrated the reference character 10 designates the dashboard of an automobile. Extending through the dashboard 10 is a pipe fitting 11 having conduits or passages 12 and 13 extending longitudinally therethrough. One end of the pipe fitting 11 is of reduced diameter and is provided with screw-threads 13a upon which a nut 14 and a lock nut 15 are screw-threaded. Interposed between the nut 14 and the dashboard 10 is a metallic washer 17. On the opposite side of the dashboard 10 is a metallic plate 18 which is provided with projections 19 adapted to be drawn into the dashboard if it is made of wood or to frictionally engage the dashboard if it is made of metal. The plate 18 is provided with a plurality of holes 20 equidistantly spaced from the longitudinal axis of the pipe fitting 11 and equidistantly spaced from each other. Engageable with the holes 20 are a plurality of projections 22 formed upon a centrally apertured disc 23 which surrounds the pipe fitting 11. A pair of screws 25 and 26 project through the disc 23 and are screw-threaded into the larger end of the pipe fitting 11. It will be noted that the screw 25 also passes through a slotted wall 28 of a bracket which is designated generally by the reference numeral 29. The slot is identified by the reference numeral 30. The bracket 29 comprises an integral arcuate plate 32 which is welded to a sheet metal wall 33 forming part of a housing which is designated generally by the reference numeral 34.

It will be readily understood that the slot 30 is provided in the wall 28 on the bracket 29 to facilitate assembly of the bracket 29 and the housing 34 with the pipe fitting 11. After the housing 34, the bracket 29 and the disc 23 have been assembled as illustrated in the drawings, the screws 25 and 26 are screw-threaded through the disc 23 and into the pipe fitting 11 so that the parts are secured rigidly to each other.

The enlarged end of the pipe fitting 11 is welded or otherwise secured to a sheet metal tank or header 35 which forms part of a radiator core designated generally by the reference numeral 36, the core 36 being provided with a second tank 37. The tank 35 is divided by a partition wall 38 into compartments 39 and 40. The compartments 39 and 40 communicate, respectively, with the passages 12 and 13.

The core 36 comprises a plurality of sheet metal tubes 42 and 43. The sheet metal tubes 42 extend between and communicate with the compartment 39 and the tank or header 37. The sheet metal tubes 43 communicate with and extend between the compartment 40 and the tank or header 37. It will be readily understood that the cooling fluid of the cooling system of the automobile may flow through the passage 12, the compartment 39, the tubes 42, the tank or header 37, the tubes 43, the compartment 40 and thence through the passage 13 back to the cooling system of the automobile. Tubes or pipes 50 and 51 are provided to connect the passages 12 and 13, respectively, to the cooling system of the automobile.

The housing 34 comprises a sheet metal wall 33 which forms the side walls of the housing. One end of the housing 34 is closed by a sheet metal ring 53 which is secured to the wall 33 by screws 55. A sheet metal ring 57 is secured to the wall 33 by screws 58 and secured to the ring 57 is a sheet metal disc 60 provided with a plurality of relatively large apertures 61. Mounted on the central portion of the disc 60 is an electric motor 63 which is connected by any suitable means (not shown) to the electrical system of the automobile so that it may be operated thereby. The shaft 64 of the motor 63 projects through the disc 60 and is provided with a fan 65 adapted to advance air between the tubes 42 and 43 and out of the housing 34 through the large aperture in the ring 53, the ring 53 being provided with shutters 68 and 69 hereinafter described. It will be noted that the cooling fluid of the automobile engine passes through the air advanced by the fan twice. In other words, it flows in one direction through the tubes 42 and returns through the tubes 43. This insures that there will be a relatively large exchange of heat between the cooling fluid and the air advanced by the fan.

To facilitate the exchange of heat between the cooling fluid and the air advanced by the fan 65, the tubes 42 and 43 are preferably provided with relatively thin metal fins 70 which project into the path of the air advanced by the fan.

As best shown in Figs. 1 and 5, the shutters 68 and 69 are pivoted by pins 73 to brackets 74 which are riveted to the ring 53, spring washers 75 being provided so that the shutters 68 and 69 will remain in any position to which they may be adjusted. The shutters 68 and 69 are provided with knobs 78 whereby they may be adjusted.

It is readily understood that when the improved heater is in operation, the fan 65 circulates the air within the automobile body through the radiator core, the air being drawn into the housing 34 through the apertures 61.

It will be noted that the heater is preferably mounted so that the flow of heated air is directed downwardly and not toward one of the occupants in the front seat of the automobile. In Fig. 1 and in full lines in Fig. 2, the heater is shown in position wherein the flow of heated air is directed downwardly in a vertical direction. In dotted lines in Fig. 2, the heater is shown in an adjusted position wherein it still directs the flow of heated air downwardly but at an angle to the vertical. It is readily understood that the heater may be moved into this adjusted position by angularly displacing the housing 34, the bracket 29 and the disc 23 around the longitudinal axis of the pipe fitting 11, these parts being angularly displaced so that the projections 22 will engage certain of the holes 20 in the plate 18. The pipe fitting 11 must also be displaced angularly a corresponding distance around its longitudinal axis to have the radiator core 36 occupy its proper position within the housing 34.

While I have shown and described certain embodiments of my invention, it is to be understood that it is capable of many modifications. Changes, therefore, in the construction and arrangement may be made without departing from the spirit and scope of the invention as disclosed in the appended claims, in which it is my intention to claim all novelty inherent in my invention as broadly as permissible, in view of the prior art.

I claim:—

1. A heat exchange device comprising a header, a second header spaced from the first-mentioned header and divided into two compartments, a set of tubes connecting one of said compartments with the first-mentioned header, a second set of tubes connecting the other compartment with the first-mentioned header whereby fluid may circulate from one of said compartments through the first set of tubes to the first-mentioned header and return through the second set of tubes to said other compartment, a pipe fitting having two passages therethrough directly attached to the second header with its passages communicating with said two compartments for connecting said compartments to a supply of fluid, and means for advancing air between the tubes of said first set and thence through the tubes of said second set.

2. The combination with a heat exchange device comprising a housing, a radiator core disposed within said housing, and means for advancing air through said housing and said radiator core, of adjustable means for supporting said core and said housing, said supporting means comprising a pipe fitting having a plurality of passages therethrough communicating with said core and with a supply of fluid, said pipe fitting being adapted to project through a supporting wall, a plate abutting against one side of said wall and provided with a plurality of apertures equidistantly spaced from each other and from the longitudinal axis of the pipe fitting, means screw-threaded on said pipe fitting and abutting against the other side of said wall, a bracket fixed to said housing, and means secured to said bracket and provided with projections engageable with said apertures.

3. The combination with a heat exchange device comprising a housing, a radiator core disposed within said housing, of a pipe fitting adapted to project through an apertured wall and supporting said core, said pipe fitting being adapted to be angularly displaced around its longitudinal axis to bring said core into angularly adjusted positions, said pipe fitting having a plurality of passages therein communicating with said core and with a supply of fluid, a bracket secured to said housing, a disc having projections thereon, means securing said disc and said bracket to said pipe fitting, and means for securing said pipe fitting to said wall, said last-mentioned means including a plate having apertures for receiving said projections.

4. The combination with a heat exchange device comprising a radiator core, of a pipe fitting adapted to project through an apertured wall and supporting said core, said core and pipe fitting being adapted to be angularly displaced around the longitudinal axis of the fitting to bring said core into angularly adjusted positions, said pipe fitting connecting said core with a source of fluid supply, a disc having projections thereon, means securing said disc to said fitting, and means for securing said pipe fitting to said wall including a plate having apertures for receiving said projections.

PHILMORE F. SPERRY.